United States Patent
Babazadeh et al.

(10) Patent No.: US 9,837,907 B1
(45) Date of Patent: Dec. 5, 2017

(54) CURRENT SENSING AND ZERO-CROSS DETECTION IN SEMI-RESONANT VOLTAGE CONVERTERS

(71) Applicant: Infineon Technologies Austria AG, Villach (AT)

(72) Inventors: Amir Babazadeh, Laguna Hills, CA (US); Robert Carroll, Andover, MA (US); David Williams, Andover, MA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/213,810

(22) Filed: Jul. 19, 2016

(51) Int. Cl.
*H02M 3/158* (2006.01)
*H02M 1/00* (2006.01)

(52) U.S. Cl.
CPC .. *H02M 3/1588* (2013.01); *H02M 2001/0058* (2013.01)

(58) Field of Classification Search
CPC ........ H02M 3/10; H02M 3/135; H02M 3/145; H02M 3/155; H02M 3/156; H02M 3/158; H02M 3/1588; G05F 1/462; G05F 1/56
USPC ..... 323/265, 282, 284, 285, 352; 363/21.02, 363/21.06, 21.14
See application file for complete search history.

(56) References Cited

U.S. PATENT DOCUMENTS

| | | | |
|---|---|---|---|
| 8,237,421 B1 * | 8/2012 | Shahani ................ | H02M 3/156 323/282 |
| 2010/0027298 A1 * | 2/2010 | Cohen ................ | H02M 3/33592 363/21.14 |
| 2011/0156664 A1 * | 6/2011 | Horihata .................... | H02P 9/48 322/24 |
| 2013/0294118 A1 * | 11/2013 | So ...................... | H02M 3/33507 363/21.16 |
| 2014/0125306 A1 * | 5/2014 | Babazadeh ............... | G05F 5/00 323/285 |
| 2014/0153292 A1 * | 6/2014 | Yan .................... | H02M 3/33523 363/21.01 |
| 2015/0115911 A1 | 4/2015 | Parto et al. | |
| 2015/0349646 A1 * | 12/2015 | Karlsson ........... | H02M 3/33576 363/21.01 |

OTHER PUBLICATIONS

Hwu, K. I. et al., "Ultrahigh Step-Down Converter", IEEE Transactions on Power Electronics, vol. 30, No. 6, Jun. 2015, pp. 3262-3274.

\* cited by examiner

*Primary Examiner* — Adolf Berhane
(74) *Attorney, Agent, or Firm* — Murphy, Bilak & Homiller, PLLC

(57) ABSTRACT

A resonant or semi-resonant voltage converter includes a synchronous rectification (SR) switch through which a current having a half-cycle sinusoidal-like shape is conducted when the SR switch is active. The current through the SR switch is estimated, so that a zero-crossing condition may be detected and used for turning off the SR switch near the optimal point at which zero current is flowing through the SR switch. The current through the SR switch may be estimated based upon a measurement of the current flowing through the SR switch, a measurement of the current flowing out from the secondary side of a transformer in the voltage converter, or a measurement corresponding to the current flowing into the primary side of the transformer.

20 Claims, 12 Drawing Sheets

CURRENT SENSING AND ZERO-CROSS DETECTION IN SEMI-RESONANT VOLTAGE CONVERTERS

TECHNICAL FIELD

The present application relates to semi-resonant and resonant voltage converters and, in particular, relates to techniques for estimating the current flowing through a synchronous rectification switch of such converters in order to detect when this current crosses zero.

BACKGROUND

Resonant and semi-resonant DC-DC voltage converters, including isolated and non-isolated topologies, are used in a variety of applications including telecommunications, consumer electronics, computer power supplies, etc. The usage of such converters is gaining popularity because of their zero-voltage and/or zero-current switching characteristics, and their ability to utilize parasitic electrical properties inherent in an electronic circuit. Such converters provide advantages including lower cost and higher efficiency as compared to other types of converters.

Many resonant and semi-resonant voltage converters include a power stage comprised of a high-side power switch and a low-side power switch. Furthermore, such converters include another low-side power switch, herein termed a synchronous rectification (SR) switch, through which a current taking the shape of the upper half cycle of a sinusoid flows when the SR switch is enabled (conducting). In order to achieve optimal efficiency, the high-side switch in the power stage should be switched when the voltage across it is zero (zero-voltage switching), whereas the SR switch should be switched when the current through it is zero (zero-current switching). In order to meet load requirements which may vary over time, such voltage converters are often controlled to switch the power switches using a variable switching frequency. Hence, the switching periods for the power switches cannot be fixed. Additionally, the circuit resonance leading to the half-cycle sinusoidally shaped current is caused by a reactance which can vary according to environmental factors, e.g., temperature. Accordingly, the most practical means for achieving zero-current switching through the SR switch is to estimate the current flowing through it on a cycle-by-cycle basis, so that an instant in time when this current crosses zero may be accurately detected for each cycle and the SR switch can be disabled at such an instant in time.

Prior techniques for estimating the SR switch current, in order to detect a time instant when this current crosses zero, are based upon measuring the voltage across the SR switch and using the drain-to-source resistance of the switch ($R_{dson}$) to derive an estimated SR current. Such techniques have the disadvantages that the drain-to-source resistance $R_{dson}$ has a temperature dependency leading to inaccurate current estimates, extra circuitry may be required for blocking a common mode voltage, and noise and body diode conduction in the SR switch may lead to poor accuracy. The net effect of these current estimate inaccuracies is that the instant in time when the SR switch current crosses zero is not accurately detected which, in turn, leads to the SR switch being turned off when there is still a not insignificant amount of current flowing through the SR switch.

Accordingly, there is a need for improved techniques for estimating the current flowing through the SR switch in a voltage converter, so that the zero-crossing point may be accurately detected and the SR switch may be turned off at a near-optimal time. These techniques should provide an accurate current estimation and should require minimal additional circuitry. Furthermore, techniques should be provided for sensing the current in portions of the voltage converter other than the SR switch itself, so as to allow for flexibility in the implementation of the voltage converter in different applications, while also providing for accurate zero-cross detection of the SR current.

SUMMARY

According to an embodiment of a switching voltage converter, the voltage converter includes a power stage, a passive circuit, a synchronous rectification (SR) switch, a current estimator, and a controller. The power stage is coupled to an input power source and is further coupled to the passive circuit. The passive circuit is connected to an output node in order to provide power to a load of the voltage converter, and typically includes a resonant tank and a transformer/tapped inductor. The passive circuit is switchably connected to ground via the SR switch, through which an SR current having a half-cycle sinusoidal shape flows when the SR switch is conducting. The current estimator is operable to estimate the SR current using a sensed (measured) current through the SR switch, wherein the SR current is sensed using a shunt resistor or a current mirror. This SR current estimate is then provided to the controller, which is operable to control the SR switch based on the estimate such that the SR switch is turned off responsive to detecting that the SR current estimate reaches a zero-crossing condition.

According to another embodiment of a switching voltage converter, the voltage converter includes a power stage, a passive circuit, a synchronous rectification (SR) switch, a sensing circuit, a current estimator, and a controller. The power stage is coupled to an input power source and is further coupled to the passive circuit. The passive circuit is connected to an output node and provides an output current to this node in order to supply power to a load of the power converter. The passive circuit typically includes a transformer/tapped inductor and a resonant tank. The passive circuit is switchably connected to ground via the SR switch, through which an SR current having a half-cycle sinusoidal shape flows when the SR switch is conducting. The sensing circuit is operable to sense (measure) the output current of the voltage converter and to provide this sensed current to the current estimator, which is operable to generate an estimate of the SR current based upon the sensed output current. This SR current estimate is then provided to the controller, which is operable to control the SR switch based on the estimate such that the SR switch is turned off responsive to detecting that the SR current estimate reaches a zero-crossing condition.

According to yet another embodiment of a switching voltage converter, the voltage converter includes a power stage, a passive circuit, a synchronous rectification (SR) switch, a sensing circuit, a current estimator, and a controller. The power stage is coupled to an input power source and is further coupled to the passive circuit. The passive circuit is connected to an output node of the voltage converter, and includes a resonant tank through which a resonant current flows. The passive circuit typically includes a transformer/tapped inductor also. The passive circuit is switchably connected to ground via the SR switch, through which an SR current having a half-cycle sinusoidal shape flows when the SR switch is conducting. The sensing circuit is operable to sense (measure) the resonant current of the voltage converter and to provide the sensed resonant current to the current estimator, which is operable to generate an estimate of the SR current based upon the sensed resonant current. The SR current estimate is then provided to the controller, which is operable to control the SR switch based on the estimate such that the SR switch is turned off responsive to detecting that the SR current estimate reaches a zero-crossing condition.

According to an embodiment of a method within a voltage converter, the method comprises the steps of turning on an SR switch, estimating current through the SR switch, and using the estimated SR current to detect a zero-crossing condition of the SR current. Once this zero-crossing condition is detected, the SR switch is disabled. In a first sub-embodiment of the method, the SR current estimate is based upon current sensed (measured) through the SR switch using a shunt resistor or a current mirror. In a second sub-embodiment, the SR current estimate is based upon sensing the current provided at the output of the voltage converter. In a third sub-embodiment, the SR current estimate is based upon sensing the current flowing through a resonant tank within the voltage converter. The techniques of this method and its sub-embodiments could be implemented within a controller and/or a current estimator, such as those described above in the voltage converter embodiments.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

DETAILED DESCRIPTION

The embodiments described herein provide techniques for estimating the current flowing through a synchronous rectification (SR) switch within a resonant or semi-resonant voltage converter. These current estimation techniques are used for detecting a zero-crossing condition of the SR switch current, so that the SR switch may be turned off when the current through it is substantially zero. It is highly desirable within resonant and semi-resonant voltage converters that the SR switch be switched (e.g., turned off) when there is no current flowing through the SR switch, as this leads to reduced power loss in the switching and, hence, a more efficient voltage converter.

While the described techniques are not limited to voltage converters using variable-frequency switching, the techniques are particularly appropriate for such converters, as the techniques allow for the current through an SR switch, and associated zero-crossing conditions of this current, to be accurately estimated for each cycle of a voltage converter, even when the switch time periods change from one cycle to the next. Additionally, the techniques are not limited to single-phase or multi-phase voltage converters. For clarity in the following, the techniques are described in the context of a single-phase voltage converter, but it should be appreciated that the techniques are readily extrapolated to multi-phase voltage converters.

Various embodiments of voltage converter circuits and methods within voltage converters are provided in the following detailed description and the associated figures. The described embodiments provide particular examples for purposes of explanation, and are not meant to be limiting. Features and aspects from the example embodiments may be combined or re-arranged, except where the context does not allow this.

Figure 1:
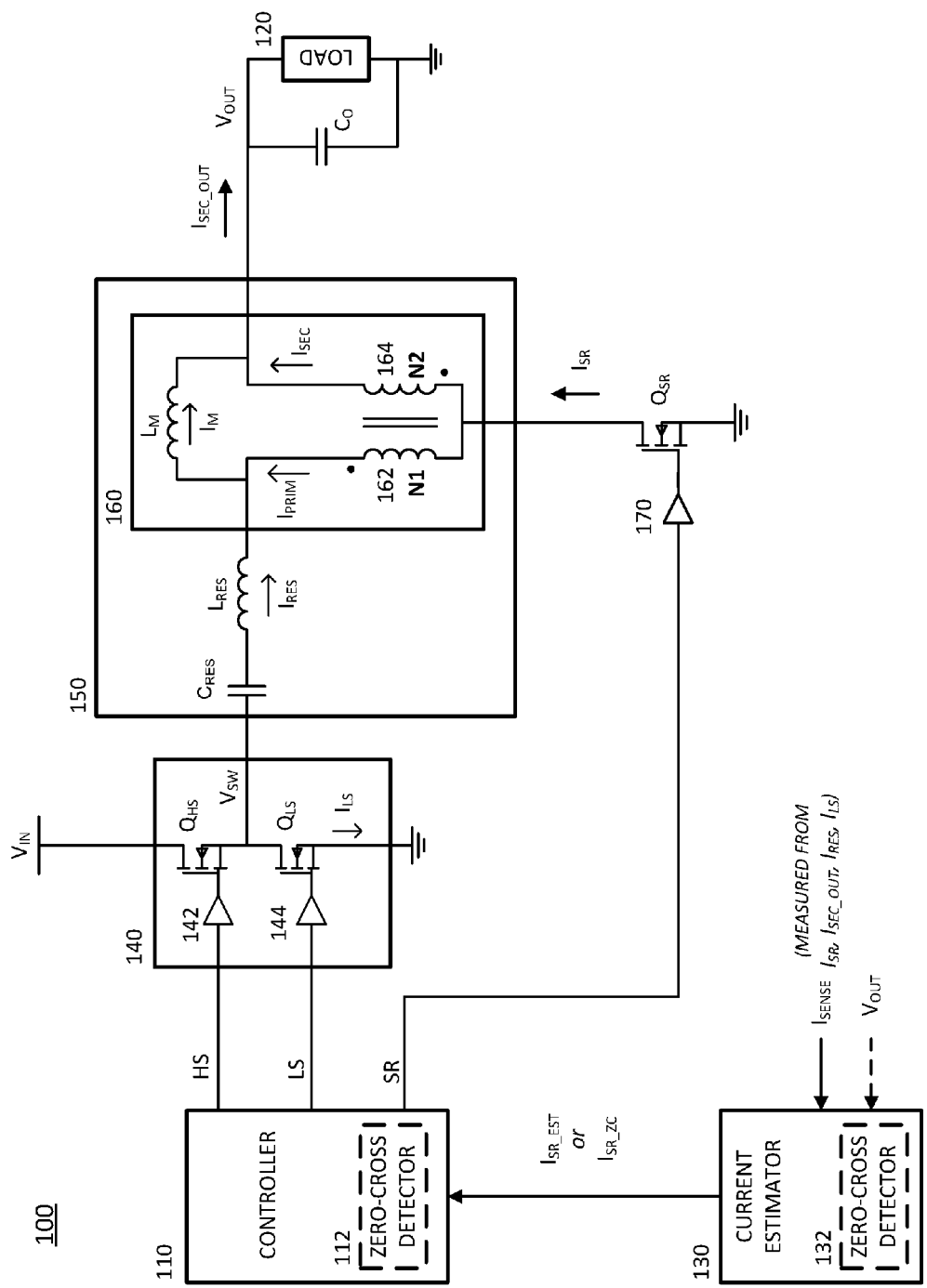
FIG. 1 illustrates a circuit diagram of a semi-resonant voltage converter including a synchronous rectification (SR) switch through which an SR current flows, and in which the SR current may be estimated based upon various current flows within the voltage converter in order to detect a zero-crossing of the SR current.

FIG. 1 illustrates a voltage converter 100 within which several embodiments of the current estimation and zero-cross detection techniques may be implemented. The circuitry of the voltage converter 100 and the current waveforms generated within the voltage converter 100 are described next in order to provide context for the more detailed embodiments illustrated in FIGS. 4-9 and described further below. These detailed embodiments vary based upon the source of a sensed current $I_{SENSE}$ that is provided to a current estimator 130. As shown in FIG. 1, the voltage converter 100 includes several current flows $I_{SR}$, $I_{SEC\_OUT}$, $I_{RES}$, and $I_{LS}$, any of which may be sensed (measured) and provided to the current estimator 130 for purposes of estimating the SR current $I_{SR}$ through the SR switch $Q_{SR}$, and detecting a zero-crossing condition for this SR current $I_{SR}$. The voltage converter 100 includes a power stage 140, a passive circuit 150, a load 120, an SR switch $Q_{SR}$, a controller 110 and a current estimator 130. Each of these circuits is described in detail below.

An input voltage $V_{IN}$ is provided to the power stage 140 at a high-side switch $Q_{HS}$ that is coupled to a low-side switch $Q_{LS}$ at a switching node $V_{SW}$. The low-side switch $Q_{LS}$ is, in turn, connected to ground. As illustrated, a low-side current $I_{LS}$ flows through the low-side switch $Q_{LS}$. Each of these switches $Q_{HS}$, $Q_{LS}$ is controlled by a respective driver 142, 144 as shown. The switching node $V_{SW}$ of the power stage 140 is coupled to the passive circuit 150, which provides an output current $I_{SEC\_OUT}$ and an output voltage $V_{OUT}$ to a load 120. An output capacitor $C_O$ stores energy provided by the output current $I_{SEC\_OUT}$ and releases energy to the load 120 and, in so doing, filters (smooths) the output voltage $V_{OUT}$.

The passive circuit 150 includes a capacitor $C_{RES}$ and an inductor $L_{RES}$ that form a resonant tank. The inductor $L_{RES}$ may merely be leakage inductance (e.g., the inherent parasitic inductance of the circuit wiring), or it may be an actual inductor component together with some leakage inductance. For ease of illustration, the inductor $L_{RES}$ is shown outside of a transformer/tapped inductor 160, but the inductor $L_{RES}$ may represent a leakage inductance of the transformer/tapped inductor 160 or such a leakage inductance together with an inductance outside of the transformer/tapped inductor 160. A resonant current $I_{RES}$ flows from the capacitor $C_{RES}$ to the transformer/tapped inductor 160, e.g., into its primary side.

The transformer/tapped inductor 160 has N1 turns in a primary-side winding 162 and N2 turns in a secondary-side winding 164. The ratio N2/N1 determines the output/input voltage ratio of the transformer/tapped inductor 160 when it is conducting current. (Conversely, the ratio N1/N2 determines the output/input current ratio of the transformer/tapped inductor 160.) Because of the high peak current provided at the output of the transformer/tapped inductor 160 and in order to reduce the AC resistance, the transformer/tapped inductor 160 is often designed to have a single turn in the secondary-side winding 164. Defining the total number of primary and secondary-side turns as n, the turns ratio is thus (n−1) to 1. Henceforth, the convention of n total winding turns and 1 turn in the secondary-side winding 164 will be used, but it should be understood that the equations and formulas that follow may instead be derived using N1 turns of the primary-side winding 162 and N2 turns of the secondary-side winding 164. As illustrated, the transformer/tapped inductor 160 is modelled to include a magnetizing inductance $L_M$ that couples a terminal of its primary winding 162 to a terminal of its secondary winding 164. The magnetizing inductance $L_M$ and a model for the transformer/tapped inductor 160 are described in more detail below in conjunction with FIG. 3.

The SR switch $Q_{SR}$ couples a center tap of the transformer/tapped inductor 160 to ground when the SR switch $Q_{SR}$ is conducting. As illustrated, the SR switch $Q_{SR}$ is controlled by an SR driver 170.

The high-side, low-side, and SR switches $Q_{HS}$, $Q_{LS}$, $Q_{SR}$ are illustrated in FIG. 1 as enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The switches $Q_{HS}$, $Q_{LS}$ of the power stage 140 and the SR switch $Q_{SR}$ may be integrated on the same semiconductor die, may each be provided on separate dies, or may otherwise be spread across a plurality of semiconductor dies. The drivers 142, 144, 170 for the switches $Q_{HS}$, $Q_{LS}$, $Q_{SR}$ may be integrated on the same semiconductor die(s) as their corresponding switches, or may be provided on separate dies.

The controller 110 generates switch control signals HS, LS, and SR, which are coupled to the drivers 142, 144, 170 that control the switches $Q_{HS}$, $Q_{LS}$, $Q_{SR}$. The switch control signals HS, LS, and SR are typically pulse-width modulated (PWM) waveforms. The controller 110 determines the frequency and duty cycles of the PWM signals HS, LS, SR, so as to meet the power requirements of the load 120. Techniques for determining the switching frequency and duty cycles based upon the load requirements of a voltage converter are, generally, well-known in the art. Such conventional techniques will not be further elaborated upon herein, in order to avoid obfuscating the unique aspects of the invention, which are directed to current estimation and zero-cross detection through the SR switch $Q_{SR}$.

In a semi-resonant voltage converter, such as that illustrated in FIG. 1, the high-side and low-side switches $Q_{HS}$, $Q_{LS}$ of the power stage 140 are controlled such that these switches $Q_{HS}$, $Q_{LS}$ do not conduct at the same time. A typical switching cycle of the voltage converter 100 begins with a "dead time" during which none of the switches $Q_{HS}$, $Q_{LS}$, $Q_{SR}$ are conducting. This is followed by a "$T_{ON}$" period during which the high-side switch $Q_{HS}$ is conducting, but the low-side switch $Q_{LS}$ and the SR switch $Q_{SR}$ are not conducting. A "$T_{OFF}$" period follows this, during which the high-side switch $Q_{HS}$ is not conducting, but the low-side switch $Q_{LS}$ and the SR switch $Q_{SR}$ are conducting. The effect of this switching on various currents within the voltage converter 100 will be described subsequently in conjunction with the waveforms illustrated in FIG. 2.

The controller 110 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The controller 110 may also include memory, e.g., non-volatile memory such as flash, that includes instructions or data for use by the processor circuitry, and one or more timers. The controller 110 may input sensor signals such as signals corresponding to $V_{OUT}$ and $I_{SEC\_OUT}$ (sensor signals not shown for ease of illustration) in order to estimate the power requirements for the load 120 and to otherwise aid in the generation of the switch control signals HS, LS, SR.

The current estimator 130 is configured to estimate the SR current $I_{SR}$ flowing through the SR switch $Q_{SR}$. This SR current estimate $I_{SR\_EST}$ may be based on a sensed current flowing through the SR switch $Q_{SR}$, or it may be based upon sensing some other current such as the output current $I_{SEC\_OUT}$ flowing from the secondary side of the transformer/tapped inductor 160, the resonant current $I_{RES}$, or the low-side current $I_{LS}$. Regardless of which current is being sensed (measured), the current estimator 130 provides the SR current estimate $I_{SR\_EST}$, or a variant thereof, to the controller 130, so that the controller 130 may turn off the SR switch $Q_{SR}$ responsive to detecting that the SR current $I_{SR}$ is at or near zero, e.g., by comparing the SR current estimate $I_{SR\_EST}$ against a small threshold. Alternatively or additionally, the current estimator 130 may detect that the estimate $I_{SR\_EST}$ of the SR current $I_{SR}$ is crossing zero and indicate to the controller 110 that such a zero crossing is detected, e.g., by generating a zero-crossing detection signal $I_{SR\_ZC}$. If the current estimator 130 is detecting the zero crossing, a zero-cross detector 132 is included in the current estimator 130. Otherwise, a zero-cross detector 112 may be included in the controller 110. Furthermore, the current estimator 130 and/or the zero-cross detector 132 may be co-located with a current sensor that is used for measuring a current, e.g., $I_{SR}$, $I_{SEC\_OUT}$, $I_{RES}$, $I_{LS}$, within the voltage converter 100. While the current estimator 130 is illustrated in FIG. 1 as a separate circuit, it could also be implemented within the controller 110.

The current estimator 130 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The current estimator 130 may also include memory, e.g., non-volatile memory such as flash, that includes instructions or data for use by the processor circuitry. The current estimator 130 inputs sensor signals (e.g., corresponding to $I_{SR}$, $I_{SEC\_OUT}$, $I_{RES}$, $I_{LS}$) from which it estimates the SR current $I_{SR}$ so that a zero-crossing condition may be detected.

Figure 2:
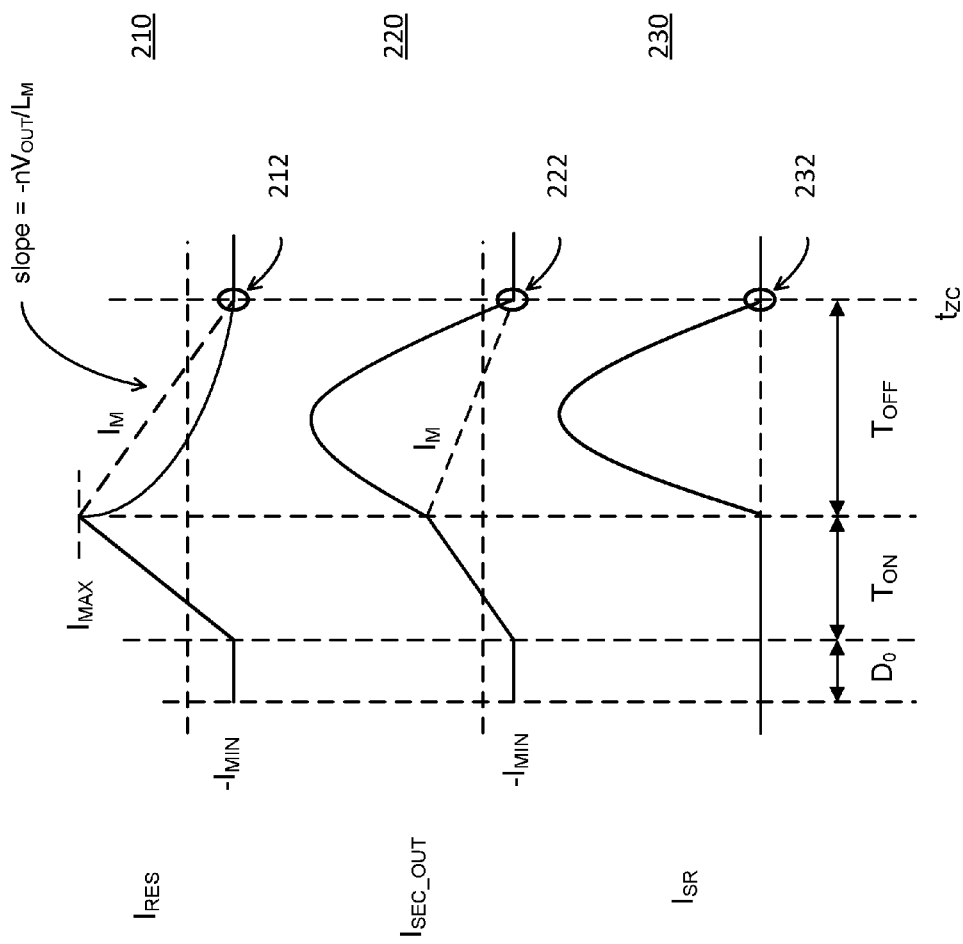
FIG. 2 illustrates waveforms corresponding to different current flows within a semi-resonant voltage converter such as that shown in FIG. 1.

FIG. 2 illustrates waveforms 210, 220, 230 for the resonant current $I_{RES}$ flowing into a primary side of the transformer/tapped inductor 160, the output current $I_{SEC\_OUT}$ flowing from a secondary side of the transformer/tapped inductor 160, and the SR current $I_{SR}$ flowing through the SR switch $Q_{SR}$. Each of these waveforms 210, 220, 230 is illustrated for one switch cycle of the voltage converter 100. Also illustrated in the waveform 210 for the resonant current $I_{RES}$ and the waveform 220 for the output current $I_{SEC\_OUT}$ is a magnetizing current $I_M$ flowing through the magnetizing inductance $L_M$.

At the start of a dead time period $D_0$, the resonant current $I_{RES}$, the output current $I_{SEC\_OUT}$ and the magnetizing current $I_M$ are at a minimum value $-I_{MIN}$. None of the power switches $Q_{HS}$, $Q_{LS}$, $Q_{SR}$ are conducting during the dead time period $D_0$, e.g., the controller 110 generates PWM signals HS=0, LS=0, SR=0. The current $-I_{MIN}$ charges the output capacitance of the low-side switch $Q_{LS}$ and causes the switch node voltage $V_{SW}$ to rise to a level near $V_{IN}$ during the dead time $D_0$. At the end of the dead time $D_0$, the high-side power switch $Q_{HS}$ is turned on, whereas the low-side switch $Q_{LS}$ and the SR switch $Q_{SR}$ remain off, e.g., by setting HS=1, LS=0, and SR=0. This state is maintained for an interval of time, denoted "$T_{ON}$," during which the switch node voltage $V_{SW}$ is tied to $V_{IN}$ through the high-side power switch $Q_{HS}$. During $T_{ON}$, the resonant current $I_{RES}$, the output current $I_{SEC\_OUT}$ and the magnetizing current $I_M$ of the voltage converter 100 rise in an approximately linear manner to a value of $I_{MAX}$. (With the SR switch $Q_{SR}$ disabled, no current flows through the primary-side winding 162 and the secondary-side winding 164 of the transformer/tapped inductor 160 meaning that the magnetizing current $I_M = I_{RES}$.) The maximum value $I_{MAX}$ may be captured by measuring or otherwise estimating the resonant current $I_{RES}$ or the output current $I_{SEC\_OUT}$ at the end of the $T_{ON}$ time interval.

During the next interval of the switching cycle, denoted as "$T_{OFF}$," the high-side switch $Q_{HS}$ is turned off, while the low-side switch $Q_{LS}$ and the SR switch $Q_{SR}$ are turned on, e.g., by setting HS=0, LS=1, and SR=1. The switch node voltage $V_{SW}$ drops to and remains at zero during the $T_{OFF}$ interval, because the switch node $V_{SW}$ is coupled to ground though the low-side switch $Q_{LS}$. Also during the $T_{OFF}$ interval, a resonance is formed within the resonance capacitor $C_{RES}$ and inductor $L_{RES}$, and results in the curved resonant current $I_{RES}$ shown in FIG. 1. A portion of this current, i.e., $I_{PRIM} = I_M - I_{RES}$, flows through the primary-side winding 162 of the transformer/tapped inductor 160, and leads to a current $I_{SEC} = (N1/N2)*(I_M - I_{RES}) = (n-1)*(I_M - I_{RES})$ flowing through the secondary-side winding 164 of the transformer/tapped inductor 160. The output current $I_{SEC\_OUT}$ is, thus, the magnetizing current $I_M$ plus the current $I_{SEC}$ flowing through the secondary-side winding 164, as given by:

$$I_{SEC\_OUT} = I_M + (n-1)*(I_M - I_{RES}). \quad (1)$$

As illustrated in FIG. 2, this current $I_{SEC\_OUT}$ initially rises during $T_{OFF}$, subsequently falls, and takes on the shape of the upper half cycle of a sinusoid.

Furthermore, during the $T_{OFF}$ interval, the SR current $I_{SR}$ is can be found by subtracting the resonant current $I_{RES}$ from the output current $I_{SEC\_OUT}$ to yield $I_{SR} = I_{SEC\_OUT} - I_{RES}$, which can be simplified to yield:

$$I_{SR} = n(I_M - I_{RES}). \quad (2)$$

When no current is flowing through the SR switch $Q_{SR}$, i.e., the SR current $I_{SR}$ is zero, all of the resonant current $I_{RES}$ flows through the magnetizing inductance $L_M$ which, in turn, flows to the output of the voltage converter, as denoted by $I_{SEC\_OUT}$ in FIG. 1. In other words, the state wherein $I_{SR}=0$ may be detected, e.g., when $I_{RES}=I_M$, $I_{SEC\_OUT}=I_M$, or $I_{RES}=I_{SEC\_OUT}$. This can be seen at time $t_{ZC}$ in the waveforms 210, 220, 230 shown in FIG. 2, and may also be derived from equations (1) and (2) above. Hence, in addition to sensing the SR current $I_{SR}$ directly, these other currents may be sensed and used to estimate the SR current $I_{SR}$ and its zero crossing.

Figure 3:
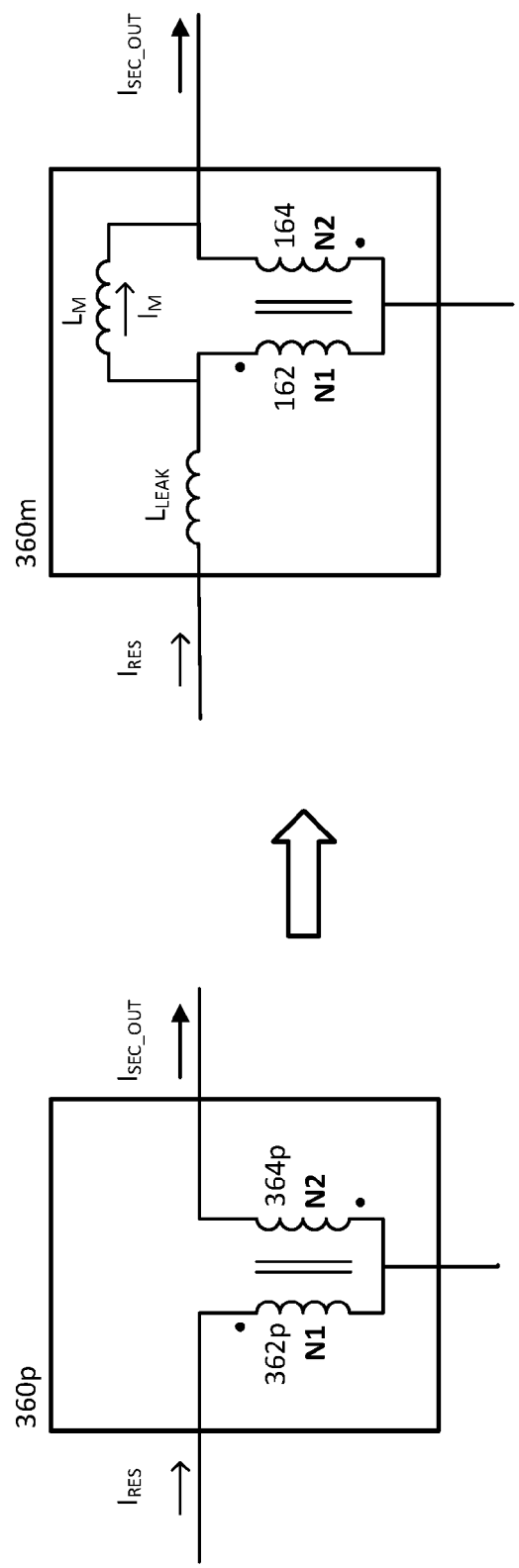
FIG. 3 illustrates a mapping from a physical transformer/tapped inductor to a model of such a transformer/tapped inductor.

FIG. 3 illustrates a mapping of a physical transformer/tapped inductor 360p to a modelled transformer/tapped inductor 360m. The physical transformer 360p has an input current $I_{RES}$ flowing into its primary-side winding 362p and an output current $I_{SEC\_OUT}$ flowing out from its secondary-side winding 364p. In an actual physical transformer, the output-to-input current does not linearly follow the ideal relationship $I_{SEC\_OUT} = (N1/N2) I_{RES}$. (The corresponding voltage relationship likewise does not follow such an ideal relationship.) The electrical characteristics (voltage and current) of the physical transformer/tapped inductor 360p may be modelled using an ideal transformer having primary winding 162 and secondary winding 164, together with a magnetizing inductance $L_M$ and a leakage inductance $L_{LEAK}$. Such a modelled transformer/tapped inductor 360m is illustrated in FIG. 3, and is assumed in the voltage converter 100 described previously, as well as in the voltage converter descriptions that follow. As described regarding the voltage converter 100 of FIG. 1, the leakage inductance $L_{LEAK}$ of the transformer/tapped inductor 360m is lumped into the inductance $L_{RES}$ and, thus, is not explicitly shown in the voltage converters of FIG. 1 or 4-9. The magnetizing inductance $L_M$ is not a separate physical inductor component, but including such an inductance $L_M$ in the transformer/tapped inductor 360m allows the model to closely approximate the electrical characteristics (input and output voltage and current) of the physical transformer/tapped inductor 360p, while treating the primary and secondary-side windings 162, 164 as an ideal transformer.

The magnetizing inductance $L_M$ may be estimated during a characterization of the transformer/tapped inductor 160, e.g., during a calibration phase of the voltage converter 100. In order to avoid obscuring the unique aspects of this invention, detailed techniques for calculating the magnetizing inductance $L_M$ are not described herein and the magnetizing inductance $L_M$ is treated as a known value. As shown in the waveforms 210, 220 of FIG. 2, the emulated magnetizing current $I_M$ flowing through the magnetizing inductance $L_M$ has a slope given by:

$$\text{slope}(I_M) = -n\frac{V_{OUT}}{L_M}. \quad (3)$$

During the $T_{OFF}$ period of the voltage converter 100, the magnetizing current $I_M$ cannot be directly measured, but it can be emulated based on, e.g., the maximum current value $I_{MAX}$, the slope of the emulated magnetizing current $I_M$ and time, as given by:

$$I_M = I_{MAX} - \left(n\frac{V_{OUT}}{L_M}\right)t, \text{ during a } T_{OFF} \text{ interval}, \quad (4)$$

wherein t is the time since the beginning of the $T_{OFF}$ interval.

Figure 11:
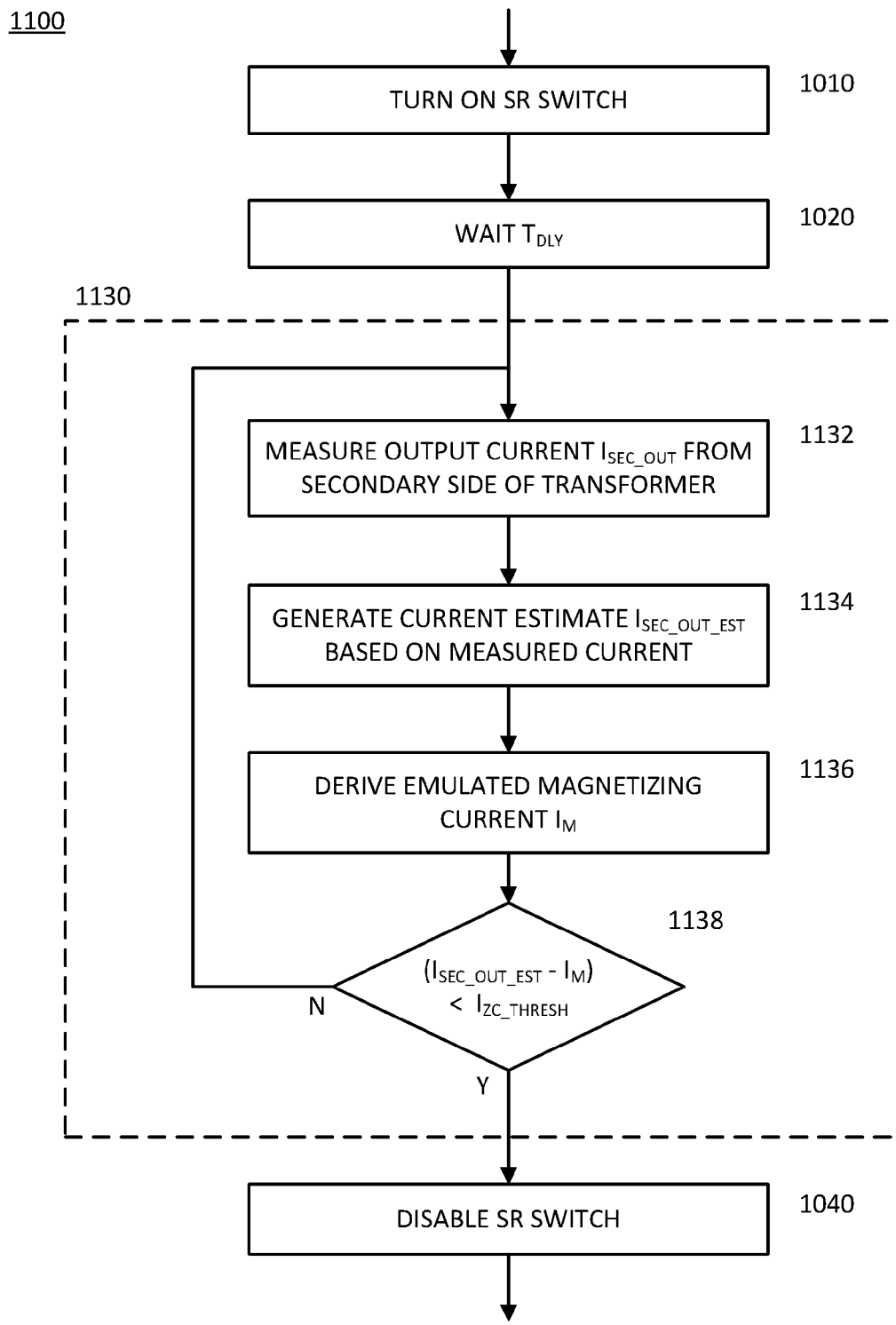
FIG. 11 illustrates an embodiment of a method for disabling an SR switch responsive to detecting a zero-cross condition of the current through the SR switch, wherein the method uses an estimated SR switch current that is based upon a current sensed flowing out from a voltage converter.
Figure 12:
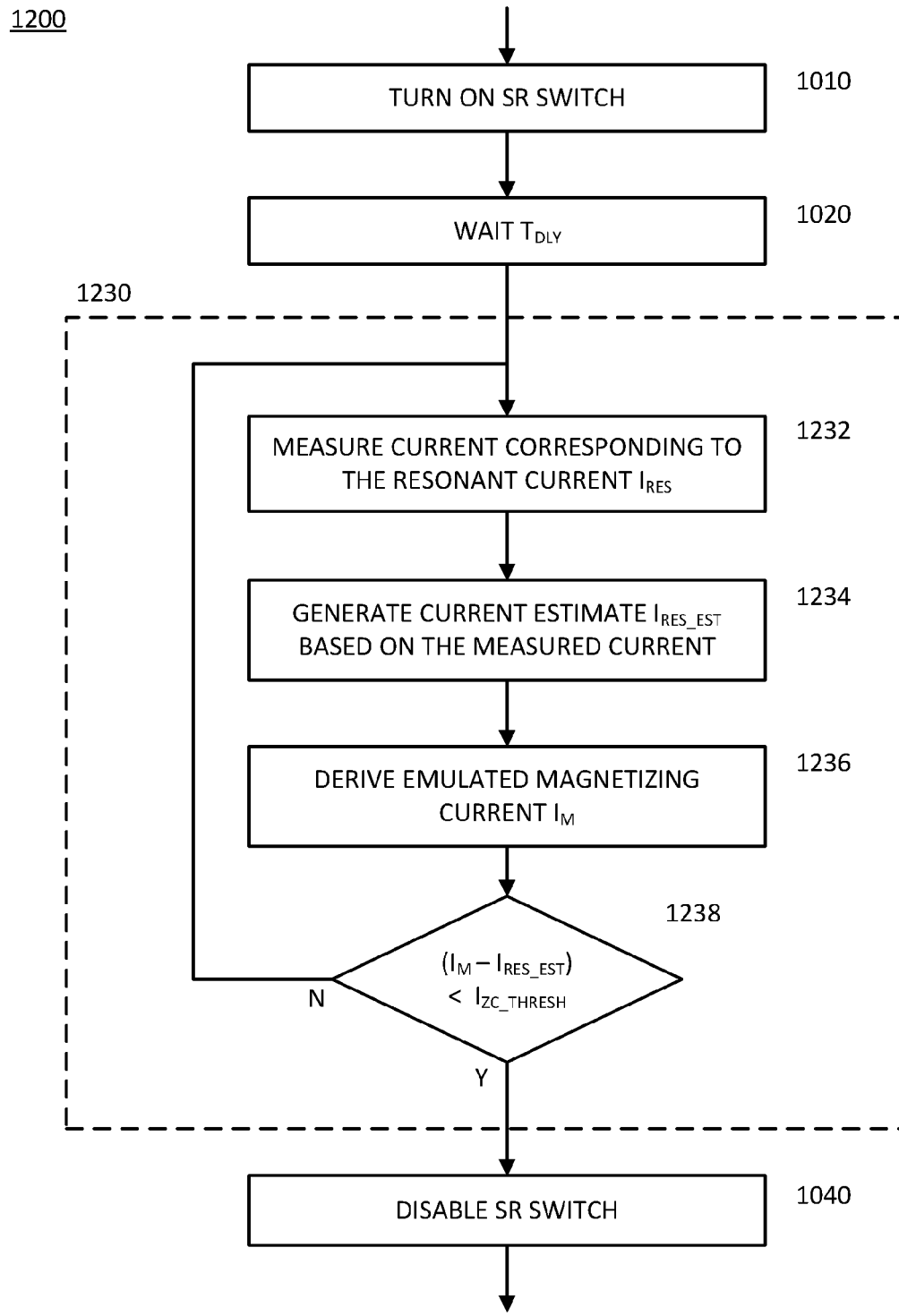
FIG. 12 illustrates an embodiment of a method for disabling an SR switch responsive to detecting a zero-cross condition of the current through the SR switch, wherein the method uses an estimated SR switch current that is based upon a sensed current that corresponds to the current flowing into the primary side of a transformer/tapped inductor within a voltage converter.

The emulated magnetizing current $I_M$ will be used in the voltage converter embodiments of FIGS. 6-9 and the method embodiments of FIGS. 11-12.

Figure 4:
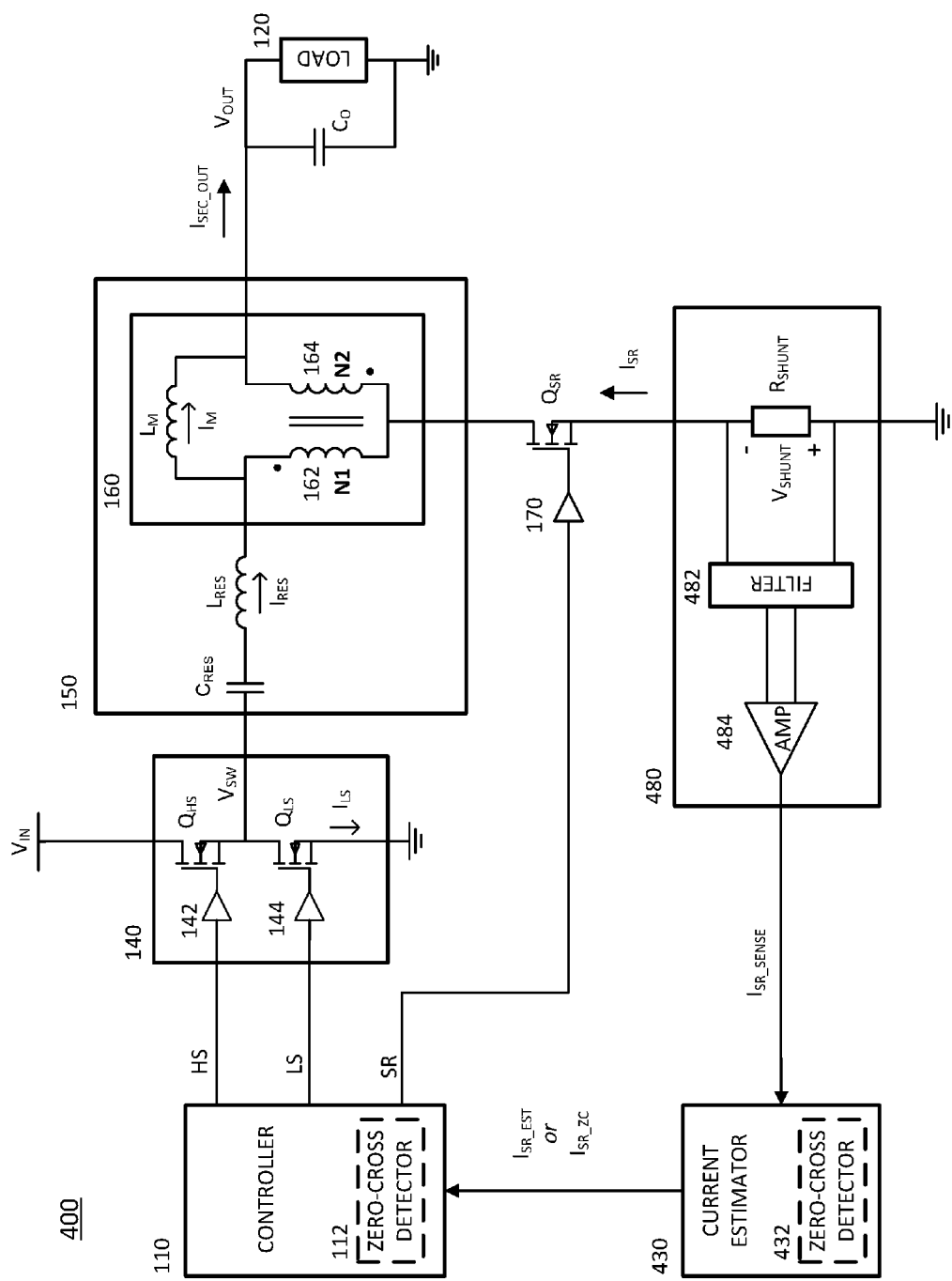
FIG. 4 illustrates an embodiment of a voltage converter in which the SR current is estimated based upon an SR current sensed using a shunt resistor in series with the SR switch.
Figure 5:
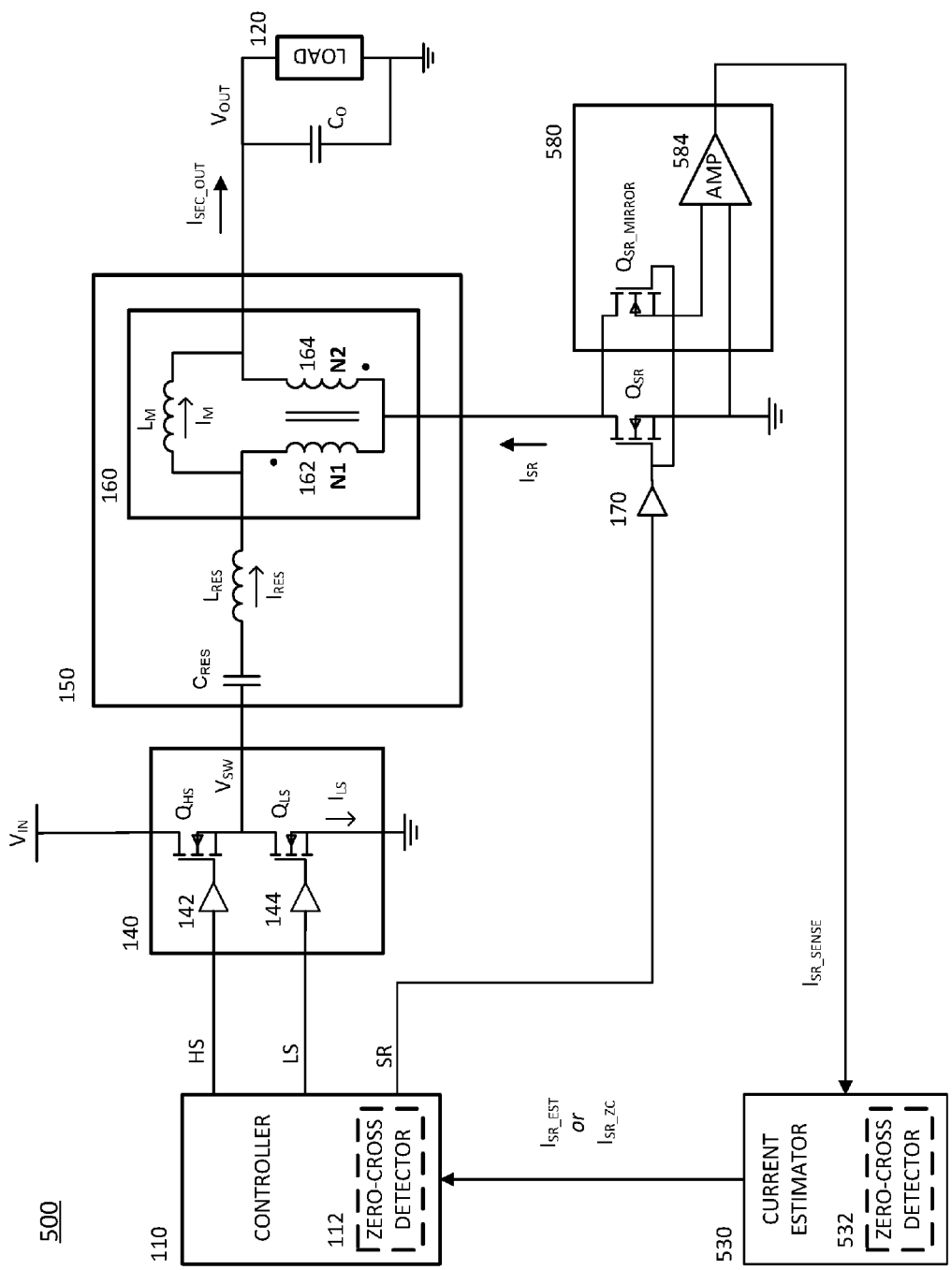
FIG. 5 illustrates an embodiment of a voltage converter in which the SR current is estimated based upon an SR current sensed using current mirror coupled to or integrated within the SR switch.

FIGS. 4 and 5 illustrate embodiments of voltage converters 400, 500 in which the SR current $I_{SR}$ is sensed (measured) directly. Rather than using the voltage across the SR switch $Q_{SR}$ and deriving the SR current $I_{SR}$ based upon the switch's drain-to-source resistance $R_{dson}$, as described in prior-art techniques, the SR current $I_{SR}$ is sensed (measured) using a shunt resistor or a current mirror. In so doing, problems associated with using the drain-to-source resistance $R_{dson}$ of the SR switch $Q_{SR}$, e.g., temperature dependence, are avoided. Note that the voltage converters 400, 500 of FIGS. 4 and 5 are similar to the voltage converter 100 of FIG. 1. In the following description, only those aspects of the voltage converters 400, 500 that differ from those of the voltage converter 100 of FIG. 1 are described in detail.

FIG. 4 illustrates a voltage converter 400 that includes a sensing circuit 480. The sensing circuit 480 uses a shunt resistor $R_{SHUNT}$ placed in series with the SR switch $Q_{SR}$ to measure the SR current $I_{SR}$. While FIG. 4 shows the shunt resistor $R_{SHUNT}$ interposed between the SR switch $Q_{SR}$ and ground, the shunt resistor $R_{SHUNT}$ could be placed elsewhere (e.g., between the SR switch $Q_{SR}$ and the transformer/tapped inductor 160) and achieve substantively equivalent results. A low-pass filter 482 placed across the shunt resistor $R_{SHUNT}$ serves to filter out noise in the voltage $V_{SHUNT}$ across the shunt resistor $R_{SHUNT}$, and provides a filtered version of the voltage $V_{SHUNT}$ to an amplifier 484. The amplifier 484 applies a gain to the filtered voltage, which may be helpful given that the SR current $I_{SR}$ needs to be accurately estimated when this current is small so that a zero-crossing condition of the current may be accurately detected. Additionally, the amplifier 484 is necessary as the shunt resistor $R_{SHUNT}$ must have a relatively small resistance (and, hence, the voltage $V_{SHUNT}$ across it will be small) in order to avoid wasting power in the shunt resistor $R_{SHUNT}$. Note that the filter 482 and the amplifier 484 may be integrated together to achieve the necessary common-mode rejection. The amplifier 484 outputs a current sensing signal $I_{SR\_SENSE}$ indicative of the sensed SR current $I_{SR}$.

The current estimator 430 inputs the current sensing signal $I_{SR\_SENSE}$ and uses it to estimate the SR current $I_{SR}$. Typically, the current sensing signal $I_{SR\_SENSE}$ is a voltage that is digitized using a digital-to-analog converter (DAC) (not shown for ease of illustration) within the current estimator 430. The resulting digitized current sensing signal $I_{SR\_SENSE}$ is converted into an estimate $I_{SR\_EST}$ of the SR current $I_{SR}$, which is provided to the controller 110 so that a zero-cross detector 112 within the controller 110 can detect a zero-crossing condition in the SR current $I_{SR}$. Responsive to detecting such a zero-crossing condition, the controller 110 turns off the SR switch $Q_{SR}$, e.g., by setting SR=0.

In an alternative sub-embodiment, the current estimator 430, using a zero-cross detector 432, may detect the zero-crossing condition and provide a signal $I_{SR\_ZC}$ to the controller 110, wherein the signal $I_{SR\_ZC}$ indicates that the current estimator 430 has detected a zero-crossing condition. In this sub-embodiment, the current estimator 430 may not need to provide the SR current estimate $I_{SR\_EST}$ to the controller 110.

Ideally, the zero-cross detector 112 of the controller 110 or the zero-cross detector 432 of the current estimator 430 would detect that the SR switch current $I_{SR}$ is exactly zero and turn the SR switch $Q_{SR}$ off responsive to such detection. In practice, the sensing circuit 480 introduces some delay, the estimation circuit 430 introduces some delay, and any DAC in the estimation circuit 430 introduces delay as well as some quantization error due to the finite resolution of the DAC. If the SR current estimation $I_{SR\_EST}$ is exactly zero or is a negative value, then the SR switch $Q_{SR}$ should be turned off immediately. Additionally, detection of a very small SR current $I_{SR}$ should also trigger a disabling of the SR switch $Q_{SR}$, in order to account for the delay and inaccuracy described above. For example, the zero-crossing condition may be detected when the SR current estimate $I_{SR\_EST}$ has fallen below some small threshold, e.g., $I_{SR\_EST} < I_{ZC\_THRESH}$.

FIG. 5 illustrates a voltage converter 500 that also directly senses the current through the SR switch $Q_{SR}$. The voltage converter 500 includes a sensing circuit 580 that uses a current mirror $Q_{SR\_MIRROR}$ to sense the SR current $I_{SR}$. The current mirror $Q_{SR\_MIRROR}$ may be coupled to or otherwise integrated within the SR switch $Q_{SR}$. An amplifier 584 is coupled to the SR switch $Q_{SR}$ and the current mirror $Q_{SR\_MIRROR}$, and provides an output signal $I_{SR\_SENSE}$ that is indicative of the sensed SR current $I_{SR}$. The sensing circuit 580 shows a particular topology for the current mirror $Q_{SR\_MIRROR}$ and its associated amplifier 584, but one skilled in the art will recognize that other current-mirror topologies achieve substantively equivalent results. The output signal $I_{SR\_SENSE}$ is provided to the current estimator 530, which uses this signal $I_{SR\_SENSE}$ to generate an SR current estimate $I_{SR\_EST}$ or a zero-crossing indication signal $I_{SR\_ZC}$ in the same way as the current estimator 430 of FIG. 4.

Figure 6:
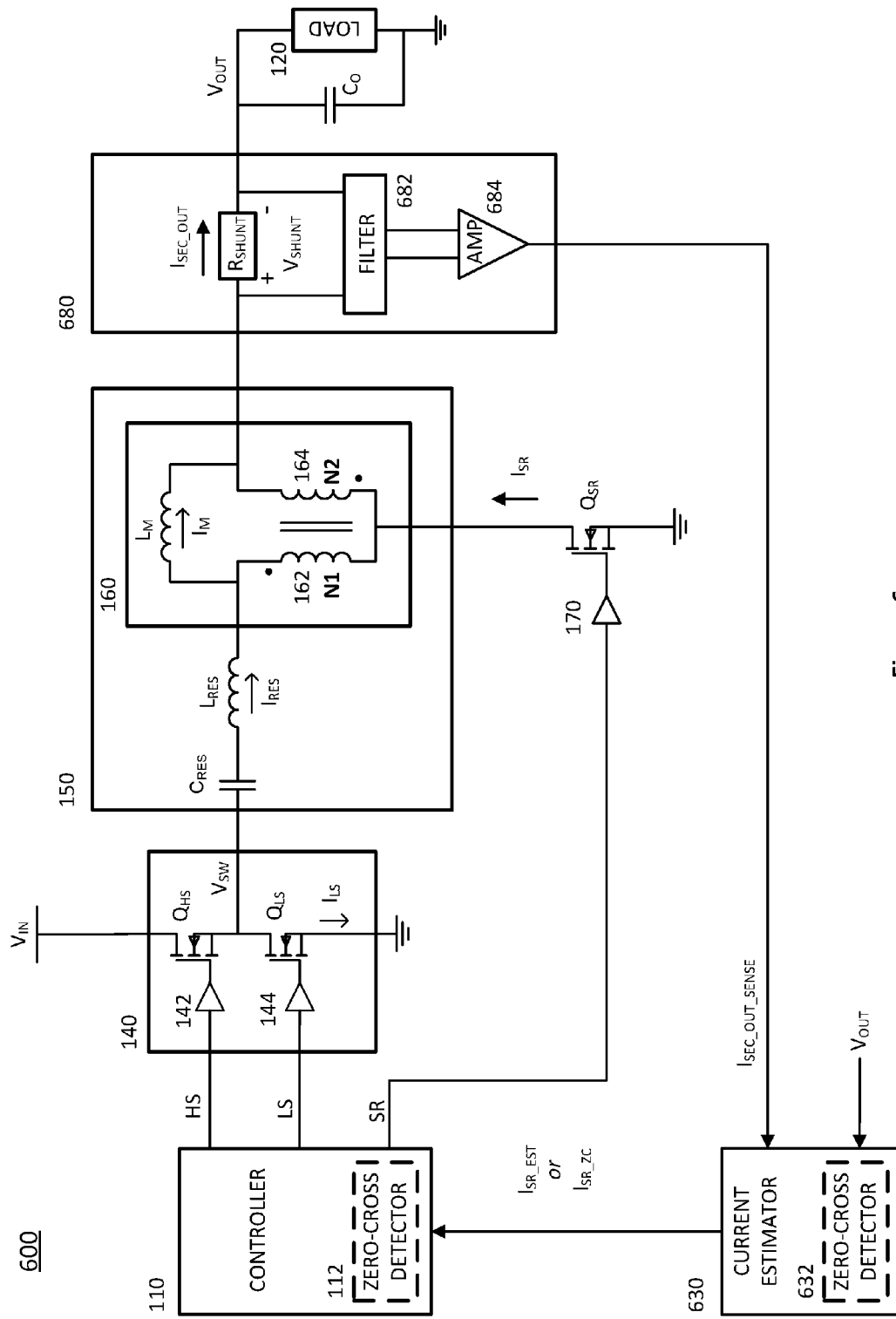
FIG. 6 illustrates an embodiment of a voltage converter in which the SR current is estimated based upon a sensed secondary output current of the voltage converter, wherein the secondary output current is sensed using a shunt resistor.
Figure 7:
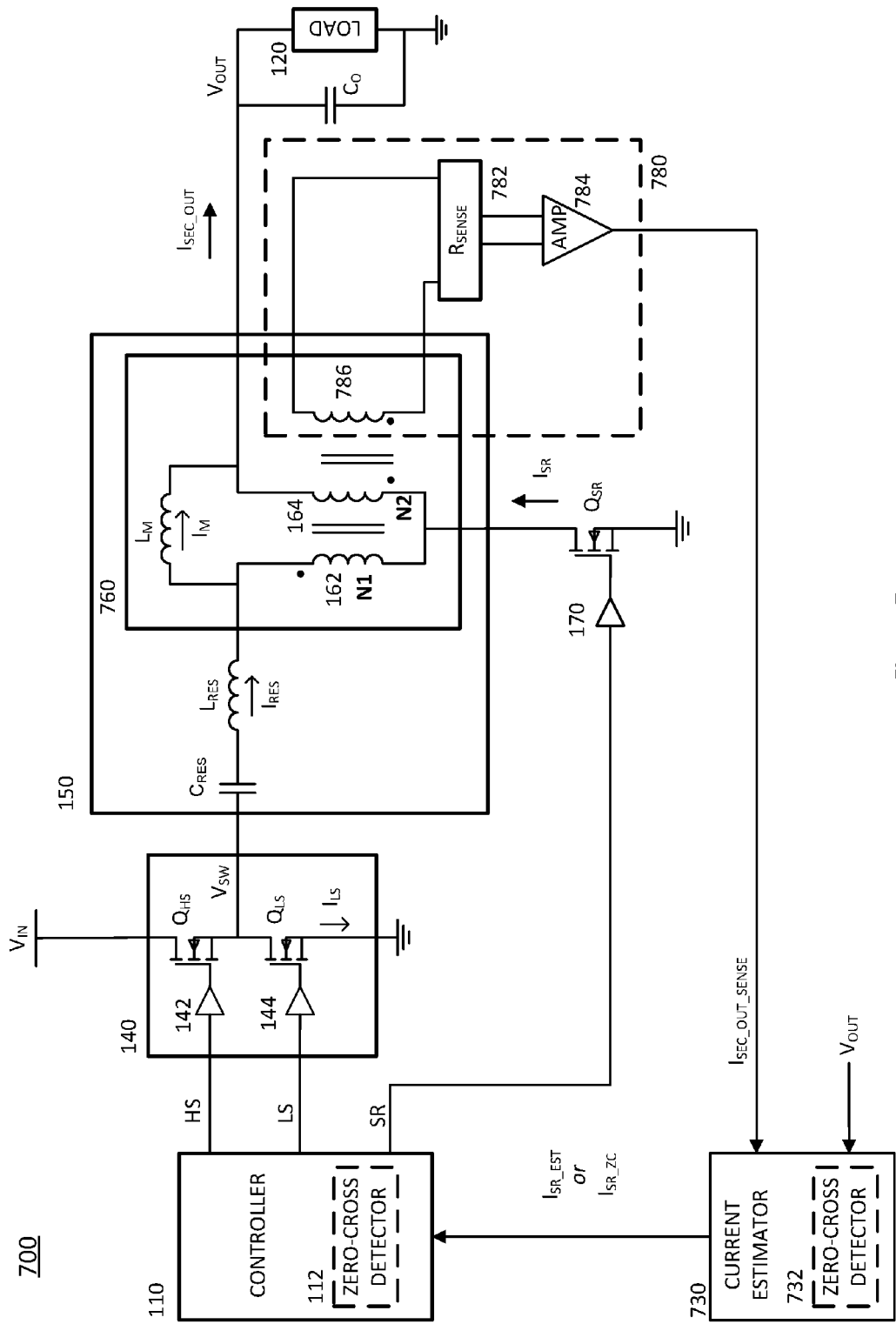
FIG. 7 illustrates an embodiment of a voltage converter in which the SR current is estimated based upon a sensed secondary output current of the voltage converter, wherein the secondary output current is sensed using an auxiliary winding inductively coupled to the secondary winding(s) of a transformer/tapped inductor within the voltage converter.

FIGS. 6 and 7 illustrate voltage converters 600, 700 in which the output current $I_{SEC\_OUT}$ from the transformer/ tapped inductor 160 is sensed (measured) and the SR current $I_{SR}$ is estimated from the sensed output current $I_{SEC\_OUT}$. Such a topology may be preferred in applications where it is not practical to incorporate a sensing circuit in series with the SR switch $Q_{SR}$.

FIG. 6 illustrates a voltage converter 600 that includes a sensing circuit 680. The sensing circuit 680 uses a shunt resistor $R_{SHUNT}$ for measuring the output current $I_{SEC\_OUT}$. A filter 682 and amplifier 684 are coupled to the shunt resistor $R_{SHUNT}$ in the same manner as described regarding the voltage converter of FIG. 4, and serve the same purpose as the corresponding components of FIG. 4. The amplifier 684 outputs a current sensing signal $I_{SEC\_OUT\_SENSE}$ indicative of the sensed output current $I_{SEC\_OUT}$.

The current estimator 630 inputs the current sensing signal $I_{SEC\_OUT\_SENSE}$ and uses it to estimate the SR current $I_{SR}$. Typically, the current sensing signal $I_{SEC\_OUT\_SENSE}$ is a voltage that is digitized using a digital-to-analog converter (DAC) (not shown for ease of illustration) within the current estimator 630. The resulting digitized version of the current sensing signal $I_{SEC\_OUT\_SENSE}$ is converted into an estimate $I_{SEC\_OUT\_EST}$ of the output current $I_{SEC\_OUT}$. Assuming a large turns ratio n (as is typical for a step-down voltage converter), the SR current $I_{SR}$ is approximately the same as the secondary current $I_{SEC}$ and may be estimated based on the output current estimate $I_{SEC\_OUT\_EST}$ and the emulated magnetizing current $I_M$ as follows:

$$I_{SR\_EST} = I_{SEC\_OUT\_EST} - I_M. \quad (5)$$

The magnetizing current $I_M$ may be emulated using equation (4), as explained previously. The output voltage $V_{OUT}$ is also input to the current estimator 630, so that it may be used in emulating the magnetizing current $I_M$. The time t since the beginning of the $T_{OFF}$ interval may also be needed, and may be supplied by a timer within the current estimator 630 or may be provided by the controller 110 (not shown for ease of illustration). The turns ratio n and a value for the magnetizing inductance $L_M$ may also be needed in emulating the magnetizing current $I_M$. These values may be stored in the current estimator 630, e.g., in non-volatile memory, or they may be supplied by the controller 110.

The SR current estimate $I_{SR\_EST}$ may be provided to the controller 110 so that the controller 110 can detect a zero-crossing condition 232 in the SR current $I_{SR}$ using a zero-cross detector 112. Responsive to detecting such a zero-crossing condition, the controller 110 turns off the SR switch $Q_{SR}$, e.g., by setting SR=0.

In an alternative sub-embodiment, the current estimator 630, using a zero-cross detector 632, may detect the zero-crossing condition 232 and provide a signal $I_{SR\_ZC}$ to the controller 110, wherein the signal $I_{SR\_ZC}$ indicates that the current estimator 630 has detected a zero-crossing condition 232.

As explained previously, the zero-crossing condition 232 may be detected by comparing the estimated SR current $I_{SR}$ against some small threshold. In the context of this voltage converter 600, the zero-crossing condition 232 is detected using the intersection of an estimate of the output current $I_{SEC\_OUT}$ and the emulated magnetizing current $I_M$. Such an intersection 222 is illustrated in waveform 220 of FIG. 2. The zero-crossing condition 222 may thus be detected using $I_{SEC\_OUT\_EST} \approx I_M$ or $(I_{SEC\_OUT\_EST} - I_M) < I_{ZC\_THRESH}$.

FIG. 7 illustrates a voltage converter 700 that is similar to the voltage converter 600 of FIG. 6 in that an output current is sensed (measured) in both of these voltage converters 600, 700. However, the voltage converter 700 uses an auxiliary winding 786 within a transformer/tapped inductor 760 for sensing the output current $I_{SEC\_OUT}$. Such an implementation avoids the use of a shunt resistor and its associated power loss and, thus, may be preferred in some applications.

A sensing circuit 780 includes the auxiliary winding 786, which is inductively coupled to the secondary winding 164 of the transformer/tapped inductor 760 and, as such, may be used for detecting the current flowing through the secondary winding 164. A sense resistor 782 is coupled across the auxiliary winding 786 to generate a voltage which is input to an amplifier 784. The amplifier 784 amplifies the sensed voltage and generates a current sensing signal $I_{SEC\_OUT\_SENSE}$ indicative of the sensed output current $I_{SEC\_OUT}$. While this auxiliary winding 786 is shown coupled to the secondary winding 164 of the modelled (ideal) transformer/tapped inductor 760, in practice the auxiliary winding 786 couples to an actual secondary winding of a physical transformer/tapped inductor (e.g., as shown in FIG. 3) and is operable to detect the secondary output current $I_{SEC\_OUT}$, which includes the current flowing through the ideal (modelled) secondary winding 164 of an ideal transformer/tapped inductor 160, as well as the magnetizing current through the magnetizing inductance.

The current estimator 730 inputs the current sensing signal $I_{SEC\_OUT\_SENSE}$ and uses it in the same way as the current estimator 630 of FIG. 6 to provide an SR current estimate $I_{SR\_EST}$ or a zero-crossing condition detection signal $I_{SR\_ZC}$ to the controller 110.

Figure 8:
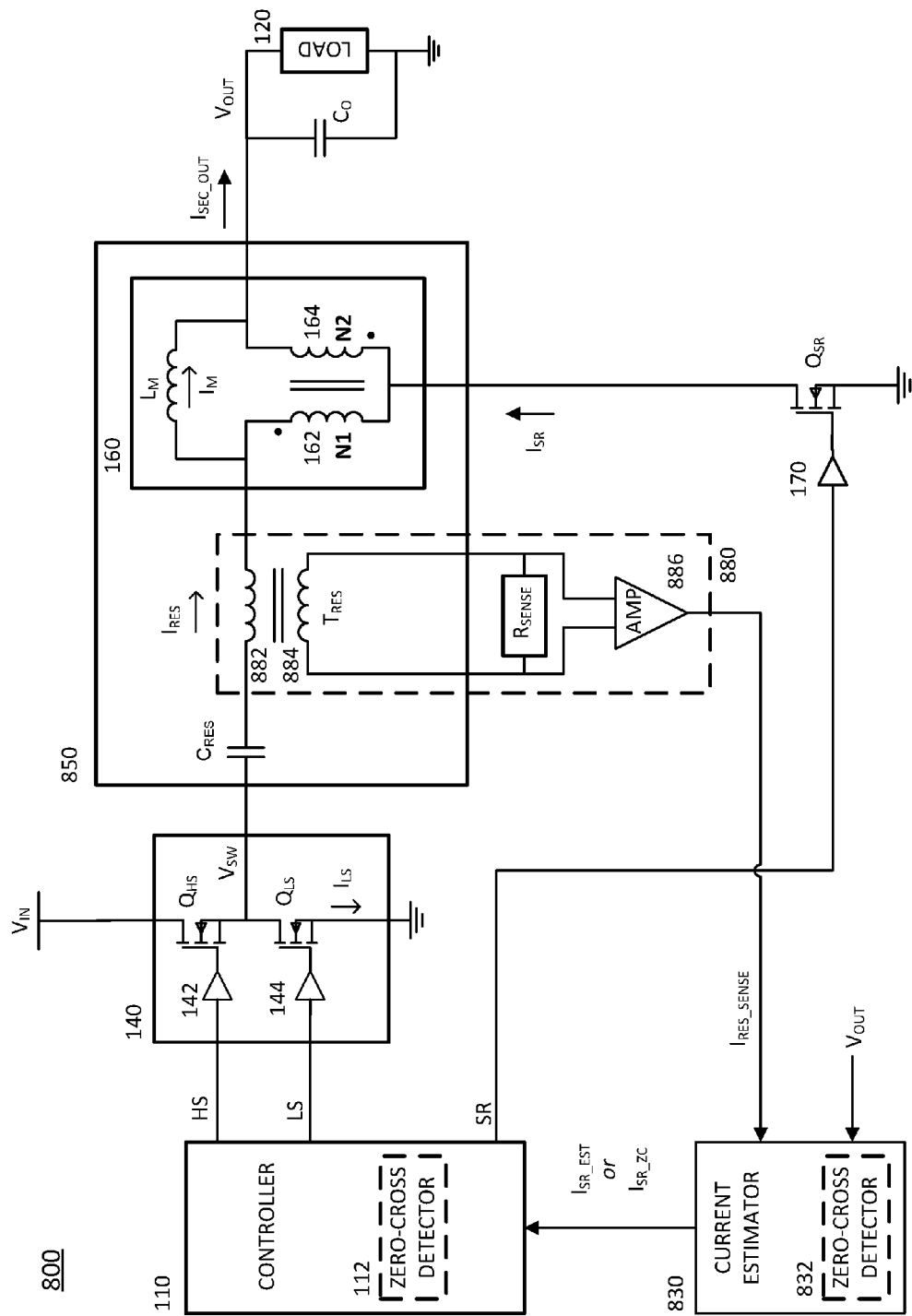
FIG. 8 illustrates an embodiment of a voltage converter in which the SR current is estimated based upon a resonant current flowing through a resonant tank of the voltage converter, wherein the resonant current is sensed using a transformer included on the primary side of a transformer/tapped inductor.
Figure 9:
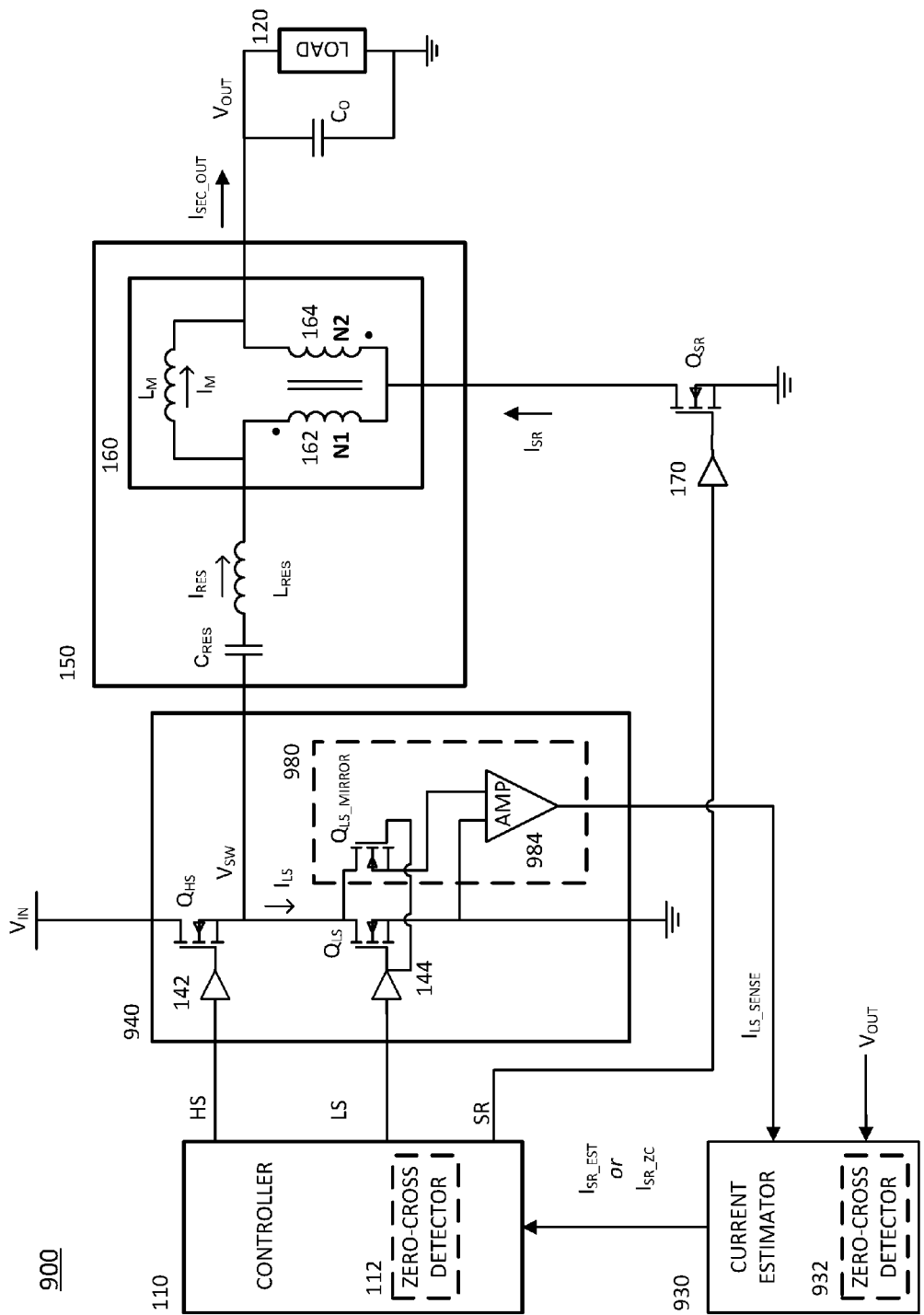
FIG. 9 illustrates an embodiment of a voltage converter in which the SR current is estimated based upon a low-side current flowing through a low-side switch within the power stage of the voltage converter, wherein the low-side current is sensed using a current mirror coupled to or integrated within the low-side switch.

FIGS. 8 and 9 illustrate voltage converters 800, 900 in which a current corresponding to a resonant current $I_{RES}$ is sensed (measured), and the SR current $I_{SR}$ is estimated based upon an estimate of the resonant current $I_{RES}$. The resonant current $I_{RES}$ flows into a primary side of the transformer/tapped inductor 160. Accordingly, this primary-side current is, for a typical step-down voltage converter, significantly smaller than currents flowing on the secondary-side of the transformer/tapped inductor 160 or through the SR switch $Q_{SR}$. This may provide power savings, as compared to techniques that sense the current on the secondary side, and may be preferred in some applications.

FIG. 8 illustrates a voltage converter 800 that includes a sensing circuit 880, and which is otherwise similar to the voltage converter 100 of FIG. 1. Within the passive circuit 850, a resonant current sensing transformer $T_{RES}$ is included. A primary winding 882 of this transformer $T_{RES}$ couples the resonant capacitor $C_{RES}$ to the transformer/tapped inductor 160, such that the resonant current $I_{RES}$ flows through the primary winding 882. A secondary winding 884 of the transformer $T_{RES}$ is coupled to a sensing resistor $R_{SENSE}$ which, in turn, is coupled to an amplifier 886. The amplifier 886 outputs a current sensing signal $I_{RES\_SENSE}$ indicative of the sensed resonant current $I_{RES}$.

The current estimator 830 inputs the current sensing signal $I_{RES\_SENSE}$ and uses it to estimate the SR current $I_{SR}$. Typically, the current sensing signal $I_{RES\_SENSE}$ is a voltage that is digitized using a digital-to-analog converter (DAC) (not shown for ease of illustration) within the current estimator 830. The resulting digitized version of the current sensing signal $I_{RES\_SENSE}$ is converted into an estimate $I_{RES\_EST}$ of the resonant current $I_{RES}$. The SR current $I_{SR}$ may then be estimated using equation (2) as follows:

$$I_{SR\_EST} = n(I_M - I_{RES\_EST}). \quad (6)$$

The magnetizing current $I_M$ may be emulated using equation (4), as explained previously. The output voltage $V_{OUT}$ may also input be to the current estimator 830, so that it may be used in emulating the magnetizing current $I_M$.

The SR current estimate $I_{SR\_EST}$ may be provided to the controller 110 so that the controller 110 can detect a zero-crossing condition 232 in the SR current $I_{SR}$ using a zero-cross detector 112. Responsive to detecting such a zero-crossing condition, the controller 110 turns off the SR switch $Q_{SR}$, e.g., by setting SR=0.

In an alternative sub-embodiment, the current estimator 830, using a zero cross detector 832, may detect the zero-crossing condition 232 and provide a signal $I_{SR\_ZC}$ to the controller 110, wherein the signal $I_{SR\_ZC}$ indicates that the current estimator 830 has detected a zero-crossing condition 232.

As explained previously, the zero-crossing condition 232 may be detected by comparing the estimated SR current $I_{SR}$ against some small threshold. In the context of this voltage converter 800, the zero-crossing condition 232 is detected using the intersection of an estimate of the resonant current $I_{RES}$ and the emulated magnetizing current $I_M$. Such an intersection 212 is illustrated in waveform 210 of FIG. 2. The zero-crossing condition 212 may thus be detected using $I_{RES} \approx I_M$ or $(I_M - I_{RES}) < I_{ZC\_THRESH}$.

In yet another sub-embodiment, the sensing circuit 880 may make use of a shunt resistor interposed between the resonant capacitor $C_{RES}$ and the transformer/tapped inductor 160, rather than the resonant transformer $T_{RES}$. A sensing circuit making use of a shunt resistor would function in the same manner as the sensing circuit 680 of FIG. 6 and, hence, is not illustrated or described further herein.

The resonant current $I_{RES}$ may also be estimated using techniques other than directly sensing this current. FIG. 9 illustrates a voltage converter 900 in which a current mirror $Q_{LS\_MIRROR}$ is used to sense a low-side current $I_{LS}$ flowing through the low-side switch $Q_{LS}$. The sensing circuit 980 is similar to the sensing circuit 580 of FIG. 5, and will not be further described herein except to note that the amplifier 984 generates a current sensing signal $I_{LS\_SENSE}$ indicative of the low-side current $I_{LS}$. The low-side current $I_{LS}$ is typically smaller than the SR current $I_{SR}$ and, thus, may be more appropriate for sensing in some applications.

The low-side current $I_{LS}$ is coupled to the resonant capacitor $C_{RES}$ that is part of the resonant tank that determines the waveform 210 of the resonant current $I_{RES}$. During the $T_{OFF}$ interval, the charge stored on the power-stage side of the resonant capacitor $C_{RES}$ generates the current $I_{LS}$ that flows to ground though the low-side switch $Q_{LS}$. This current $I_{LS}$ takes the shape of a decaying exponential, in a similar manner to that illustrated in the waveform 210 of the resonant current $I_{RES}$ that is flowing from the other side of the resonant capacitor $C_{RES}$. The low-side current $I_{LS}$ may be related to the resonant current $I_{RES}$ in a closed form using circuit parameters such as the resonant capacitance $C_{RES}$, resonant inductance $L_{RES}$, and modelled electrical characteristics for the low-side switch $Q_{LS}$, or the correspondence may be empirically determined (characterized), e.g., during a calibration phase of the voltage converter 900.

The current estimator 930 inputs the current sensing signal $I_{LS\_SENSE}$ and uses it to estimate the SR current $I_{SR}$. The current estimator 930 estimates the low-side current $I_{LS}$ and translates this into an estimate $I_{RES\_EST}$ of the resonant current $I_{RES}$. Once the current estimator 930 has this resonant current estimate $I_{RES\_EST}$, it generates the estimated SR current $I_{SR\_EST}$ and/or the zero-crossing detection signal $I_{SR\_ZC}$ (using zero-cross detector 932) in the same manner as the current estimator 830 of FIG. 8, and provides one or both of these signals to the controller 110.

Figure 10:
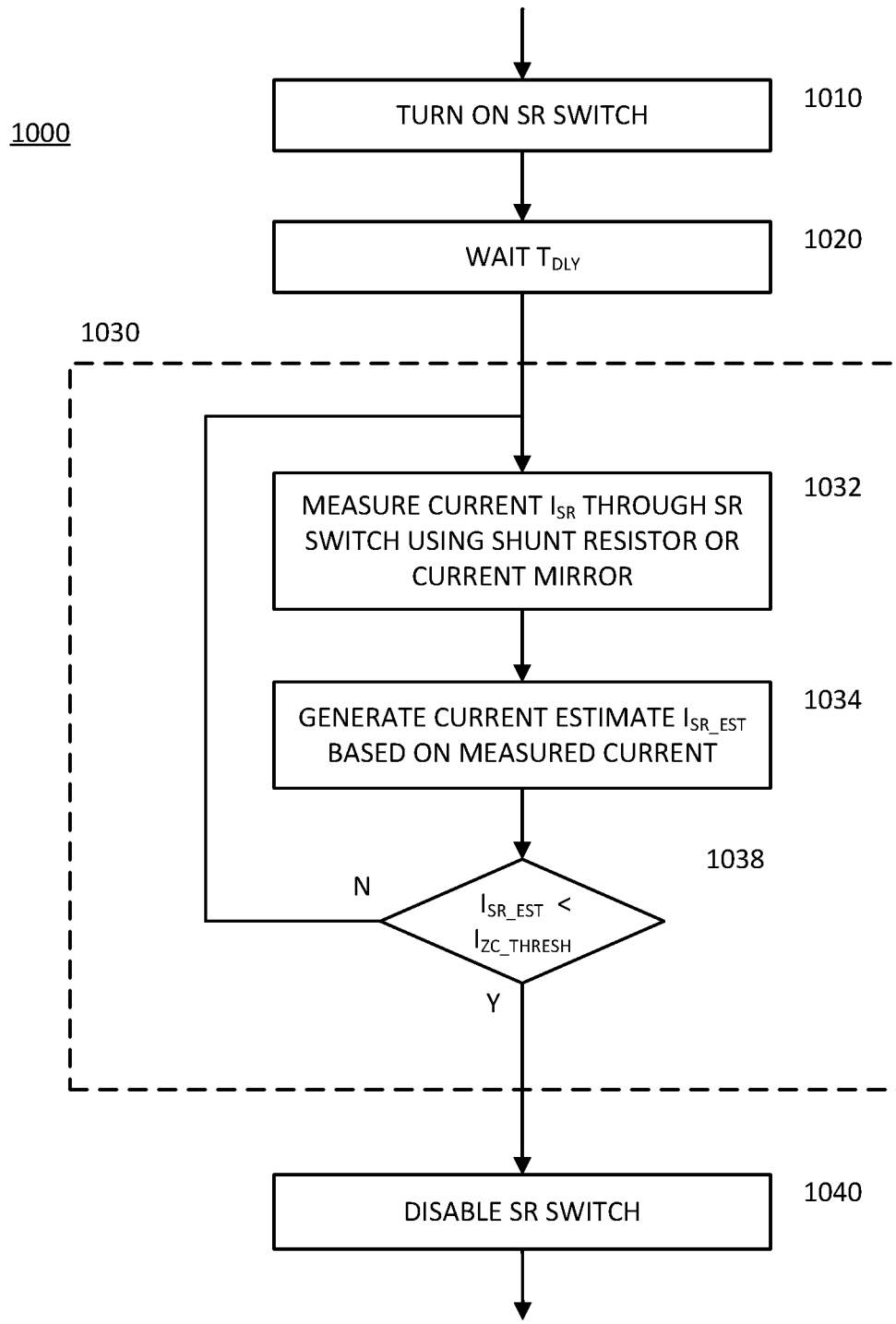
FIG. 10 illustrates an embodiment of a method for disabling an SR switch responsive to detecting a zero-cross condition of the current through the SR switch, wherein the method uses a current sensed through the SR switch to estimate the SR current.

FIGS. 10-12 illustrate embodiments of methods for estimating the SR current through an SR switch in a voltage converter. The techniques of these methods correspond closely to the techniques provided above regarding the voltage converters of FIGS. 1 and 4-9. The methods in FIGS. 10-12 may be implemented in a controller and/or a current estimator, such as those described in the voltage converter 100 of FIG. 1.

FIG. 10 illustrates a method 1000 for estimating the current through an SR switch, detecting a zero-crossing condition of this current, and disabling the switch responsive to such detection. The method begins with a step of turning on 1010 an SR switch. Once the SR switch is enabled thusly, the current through it rises as shown in the waveform 230 of FIG. 2. In a step 1020, a delay $T_{DLY}$ is incurred. Such a delay may be helpful so that the current estimation and zero-cross detection techniques 1030 are not performed while the SR current is rising, since it is known that the SR switch should not be disabled during such an interval. For example, the delay $T_{DLY}$ may be taken as half of the interval $T_{OFF}$, or may be larger if the $T_{OFF}$ interval can be estimated well, e.g., $T_{DLY} = T_{OFF} - \Delta$. At the very least, the delay $T_{DLY}$ should be large enough that the zero-current condition at the start of the $T_{OFF}$ interval is not mistakenly detected as being the zero-crossing condition 232 at the end of the $T_{OFF}$ interval, which is intended to be detected.

After enabling the SR switch and waiting for the delay $T_{DLY}$, the current through the SR switch is estimated to detect a zero-crossing condition. Once the zero-crossing condition is detected, the SR switch is disabled (turned off) 1040.

The current estimation is performed by measuring 1032 the current $I_{SR}$ through the SR switch using a shunt resistor or a current mirror. A current estimate $I_{SR\_EST}$ is generated 1034 based on the measured current. The estimated SR current $I_{SR\_EST}$ is compared 1038 against a threshold $I_{ZC\_THRESH}$ to determine if a zero-crossing condition exists. If the comparison 1038 indicates that the estimated current estimate $I_{SR\_EST}$ is substantively zero (e.g., less than the threshold $I_{ZC\_THRESH}$), the SR switch is disabled 1040 such that it does not conduct current. Otherwise, the steps beginning with measuring 1032 the current are repeated.

FIG. 11 illustrates a method 1100 that is similar to that of FIG. 10, except that the current estimation does not directly use a current sensed through the SR switch. Only the steps that differ from those of FIG. 10 are described below. These steps are designated by the box 1130, in which steps for detecting a zero-crossing condition are provided.

An output current $I_{SEC\_OUT}$ from the secondary side of a transformer is measured 1132. An estimate $I_{SEC\_OUT\_EST}$ of the output current is generated 1134 based upon the measured current. Next, a magnetizing current $I_M$ is emulated 1136. The difference between the estimated output current estimate $I_{SEC\_OUT\_EST}$ and the emulated magnetizing current $I_M$ is compared 1138 against a zero-crossing threshold $I_{ZC\_THRESH}$. If this difference is less than the threshold, i.e., if $I_{SEC\_OUT\_EST}$ and $I_M$ are nearly the same, a zero-crossing condition has been detected and the loop is exited. Otherwise, the steps of box 1130 are repeated.

FIG. 12 illustrates a method 1200 that is similar to that of FIG. 11, except that the current estimation is based upon a resonant current $I_{RES}$ that flows into the primary side of a transformer, as opposed to the current estimation of FIG. 11 that uses a current flowing out of the secondary side of a transformer. The following description focuses on the steps that differ from those of FIG. 11. These differing steps are located in box 1230, wherein steps for detecting a zero-crossing condition are provided.

A current corresponding to the resonant current $I_{RES}$ is measured 1232. An estimate $I_{RES\_EST}$ of the resonant current is generated 1234 based upon the measured current. Next, a magnetizing current $I_M$ is emulated 1236. The difference between the emulated magnetizing current $I_M$ and the estimated resonant current estimate $I_{RES\_EST}$ is compared 1238 against a zero-crossing threshold $I_{ZC\_THRESH}$. If this difference is less than the threshold, i.e., if $I_{RES\_EST}$ and $I_M$ are nearly equal, a zero-crossing condition has been detected and the loop is exited. Otherwise, the steps of box 1230 are repeated.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A voltage converter, comprising:
a power stage coupled to an input power source;
a passive circuit coupling the power stage to an output node of the voltage converter and providing an output secondary current to the output node;
a synchronous rectification (SR) switch through which an SR current having a half-cycle sinusoidal-like shape is conducted when the SR switch is conducting, the SR switch coupling the passive circuit to ground when the SR switch is conducting;
a sensing circuit operable to sense the output secondary current and generate a sensed output secondary current;
a current estimator operable to estimate an SR current flowing through the SR switch based on the sensed output secondary current; and
a controller operable to control switching of the SR switch by providing a control signal to the SR switch, wherein the SR switch is turned off based on the SR current estimate.

2. The voltage converter of claim 1,
wherein the passive circuit comprises a transformer/tapped inductor having a primary winding, a secondary winding, and a magnetizing inductance, and
wherein the current estimator is further operable to estimate the SR current based further upon an emulated magnetizing current flowing through the magnetizing inductance.

3. The voltage converter of claim 2, wherein the emulated magnetizing current is based upon a turns ratio n of the transformer/tapped inductor, a voltage $V_{OUT}$ at the output node, and an estimate of the magnetizing inductance $L_M$.

4. The voltage converter of claim 3, wherein a slope of the emulated magnetizing current is given by:

$$\text{slope}(I_M) = -n\frac{V_{OUT}}{L_M},$$

and the emulated magnetizing current is estimated based upon the slope.

5. The voltage converter of claim 2,
wherein the current estimator is further operable to detect that the sensed output secondary current and the emulated magnetizing current have intersected, and to signal this detection to the controller, and
wherein the controller is further operable to turn off the SR switch responsive to the detection.

6. The voltage converter of claim 1, wherein the sensing circuit comprises:
a shunt resistor interposed between the passive circuit and the output node;
a low-pass filter coupled to both terminals of the shunt resistor; and
an amplifier coupled to the low-pass filter, the amplifier providing the sensed output secondary current to the current estimator.

7. The voltage converter of claim 1, wherein the sensing circuit comprises:
an auxiliary winding integrated within or inductively coupled to the passive circuit, the auxiliary winding operable to provide the sensed output secondary current.

8. The voltage converter of claim 1, wherein a phase comprises the power stage, the passive circuit, the SR switch, and the sensing circuit, and the voltage converter comprises a plurality of these phases.

9. The voltage converter of claim 1, wherein the controller is further operable to use a variable frequency in providing the control signal to the SR switch, the variable frequency being based upon power requirements of a load of the voltage converter.

10. A voltage converter, comprising:
a power stage coupled to an input power source;
a passive circuit coupling the power stage to an output node of the voltage converter and comprising a resonant tank through which a resonant current flows;
a synchronous rectification (SR) switch through which an SR current having a half-cycle sinusoidal-like shape is conducted when the SR switch is conducting, the SR switch coupling the passive circuit to ground when the SR switch is conducting;
a sensing circuit operable to sense a current corresponding to the resonant current and to generate a sensed resonant current;
a current estimator operable to estimate an SR current flowing through the SR switch based on the sensed resonant current; and
a controller operable to control switching of the SR switch by providing a control signal to the SR switch, wherein the SR switch is turned off based on the SR current estimate.

11. The voltage converter of claim 10,
wherein the passive circuit comprises a transformer/tapped inductor having a primary winding, a secondary winding, and a magnetizing inductance, and
wherein the current estimator is further operable to estimate the SR current based further upon an emulated magnetizing current flowing through the magnetizing inductance.

12. The voltage converter of claim 11, wherein the emulated magnetizing current is based upon a turns ratio of the transformer/tapped inductor, a voltage at the output node, and an estimate of the magnetizing inductance.

13. The voltage converter of claim 11,
wherein the current estimator is further operable to detect that the sensed resonant current and the emulated magnetizing current have intersected, and to signal this detection to the controller, and wherein the controller is further operable to turn off the SR switch responsive to the detection.

14. The voltage converter of claim 10, wherein the sensing circuit comprises:

a current transformer that is inductively coupled to or integrated within the resonant tank, and that is operable to generate the sensed resonant current.

15. The voltage converter of claim 10, wherein the power stage comprises a high-side switch for switchably coupling the passive circuit to the input power source and a low-side switch for switchably coupling the passive circuit to ground, wherein the sensing circuit comprises a current mirror that is coupled to or integrated within the low-side switch, and wherein the sensing circuit is further operable to generate the sensed resonant current based upon the current through the low-side switch as sensed by the current mirror.

16. A voltage converter, comprising:

a power stage coupled to an input power source;

a passive circuit that couples the power stage to an output node of the voltage converter;

a synchronous rectification (SR) switch through which an SR current having a half-cycle sinusoidal-like shape is conducted when the SR switch is conducted, the SR switch coupling the passive circuit to ground when the SR switch is conducted;

a current estimator operable to estimate the SR current based on a sensed SR current through the SR switch, wherein the sensed SR current is sensed using at least one of a shunt resistor and a current mirror; and a controller operable to control switching of the SR switch by providing a control signal to the SR switch, wherein the SR switch is turned off based on the SR current estimate provided by the current estimator.

17. The voltage converter of claim 16, wherein the controller is further operable to turn off the SR switch responsive to detecting a zero-crossing condition of the SR current estimate.

18. The voltage converter of claim 16, wherein the power stage includes a high-side switch and a low-side switch coupled to the high-side switch at a switching node, and wherein the passive circuit includes a transformer/tapped-inductor, the passive circuit coupling the switching node to the output node of the voltage converter.

19. The voltage converter of claim 16, wherein the sensed SR current is sensed through the shunt resistor and the shunt resistor is coupled to the SR switch, the voltage converter further comprising:

a low-pass filter coupled to both terminals of the shunt resistor; and an amplifier coupled to the low-pass filter, the amplifier providing the sensed SR current to the current estimator.

20. The voltage converter of claim 16, wherein the sensed SR current is sensed using the current mirror, the current mirror being coupled to or integrated within the SR switch, the voltage converter further comprising:

an amplifier coupled to the current mirror, the amplifier providing the sensed SR current to the current estimator.

* * * * *